US012566276B2

(12) United States Patent
Chauvin et al.

(10) Patent No.: US 12,566,276 B2
(45) Date of Patent: Mar. 3, 2026

(54) METHOD FOR DETERMINING WIND SPEED COMPONENTS BY MEANS OF A LASER REMOTE SENSOR

(71) Applicant: IFP Energies nouvelles, Rueil-Malmaison (FR)

(72) Inventors: Jonathan Chauvin, Rueil-Malmaison Cedex (FR); Benoit Bayon; Fabrice Guillemin, Rueil-Malmaison Cedex (FR); Romain Goussault, Rueil-Malmaison Cedex (FR); Guillaume Sabiron, Rueil-Malmaison Cedex (FR)

(73) Assignee: IFP ENERGIES NOUVELLES, Rueil-Malmaison Cedex (FR)

( * ) Notice: Subject to any disclaimer, the term of this patent is extended or adjusted under 35 U.S.C. 154(b) by 313 days.

(21) Appl. No.: 17/926,643

(22) PCT Filed: May 18, 2021

(86) PCT No.: PCT/EP2021/063082
§ 371 (c)(1),
(2) Date: Nov. 21, 2022

(87) PCT Pub. No.: WO2021/249728
PCT Pub. Date: Dec. 16, 2021

(65) Prior Publication Data
US 2023/0204786 A1 Jun. 29, 2023

(30) Foreign Application Priority Data
Jun. 8, 2020 (FR) ...................................... 2005939

(51) Int. Cl.
*G01S 17/95* (2006.01)

(52) U.S. Cl.
CPC ..................................... *G01S 17/95* (2013.01)

(58) Field of Classification Search
CPC ........................................................ G01S 17/95
See application file for complete search history.

(56) References Cited

U.S. PATENT DOCUMENTS

2019/0293836 A1* 9/2019 Nabi .......................... G01P 5/26
2019/0293837 A1 9/2019 Nabi et al.

FOREIGN PATENT DOCUMENTS

CA 2777864 * 11/2012 ............. G01C 11/00
EP 3287810 A1 2/2018
(Continued)

OTHER PUBLICATIONS

Torben Knudsen et al., "Prediction models for wind speed at turbine locations in a wind farm", Wind Energy, 2011, 14, pp. 877-894.*
(Continued)

*Primary Examiner* — Alexander Satanovsky

(74) *Attorney, Agent, or Firm* — Fitch, Even, Tabin & Flannery LLP

(57) ABSTRACT

The invention is a method for determining wind speed components by using a placed LiDAR sensor (1). For this method, the wind speed components are first approximated by using the signals from the LiDAR sensor (1). These approximations are used in a wind signal model, and then used in a non-stationary Kalman filter (KAL), to construct filtered measurement signals. The filtered measurement signals are then used to reconstruct (REC) the wind speed components.

22 Claims, 2 Drawing Sheets

(56) References Cited

FOREIGN PATENT DOCUMENTS

| JP | 3774689 | * | 5/2006 | ............ | G01S 17/95 |
| WO | WO 2020025984 | * | 6/2000 | ............ | G01S 17/95 |

OTHER PUBLICATIONS

P. Towers et al., "Real-time wind field reconstruction from LiDAR measurements using a dynamic wind model and state estimation", Wind Energy, 2016;19, pp. 133-150.*

International Search Report for PCT/EP2021/063082 dated Jul. 30, 2021; 5 pages.

Knudsen, T., "Prediction models for Wind Speed at Turbine Locations in a Wind Farm", Wind Energy, vol. 14, No. 7, Sep. 30, 2011, pp. 877-894.

Kim, et al., "Correction of LiDar Measurement Error in Complex Terrain by CFD: Case Study of the Yangyang Pumped Storage Plant", Wind Engineering, vol. 41, No. 4, Aug. 1, 2017, pp. 226-234.

Suvire, et al., "Wind Farm: Dynamic Model and Impact on a Weak Power System", Transmission and Distribution Conference and Exposition: Latin America, 2008 IEEE/PES, Piscataway, NJ, Aug. 13, 2008, pp. 1-8.

Towers, et al., "Real-Time Wind Field Reconstruction from LiDar Measurements Using a Dynamic Wind Model and State Estimation: LiDar Wind Field Estimation," Wind Energy, vol. 19, No. 1, Nov. 21, 2014, pp. 133-150.

* cited by examiner

[Fig 1]
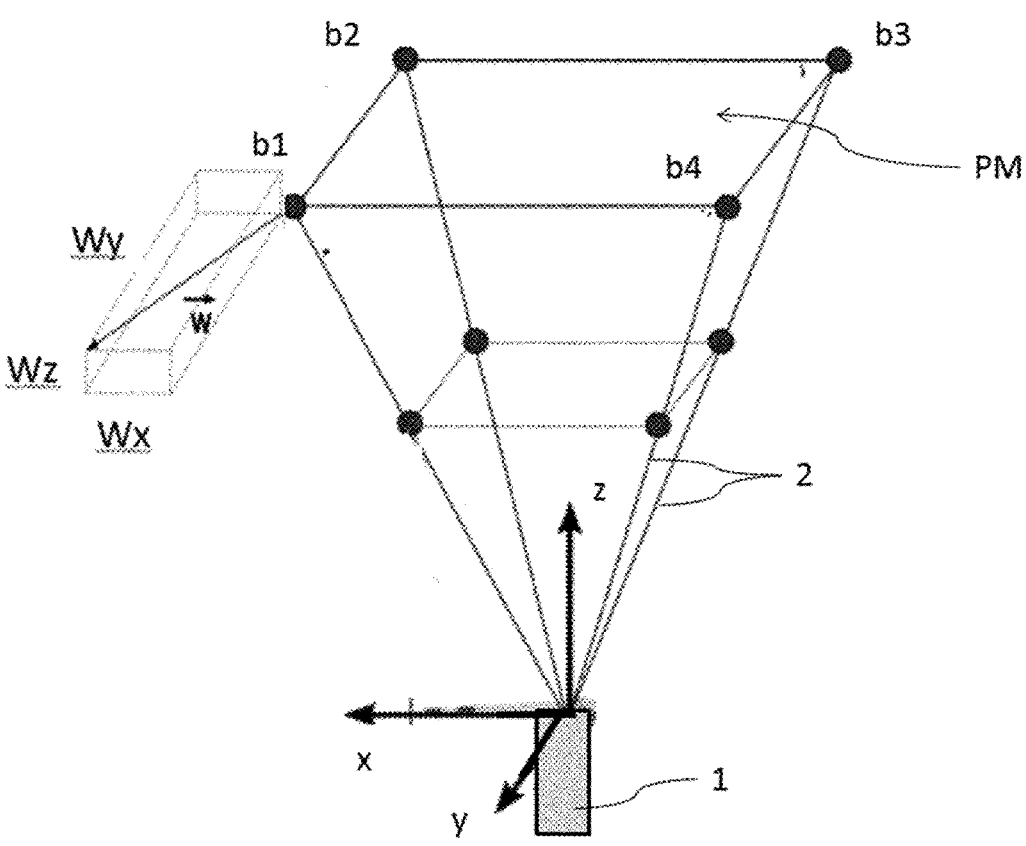
[Fig 2]
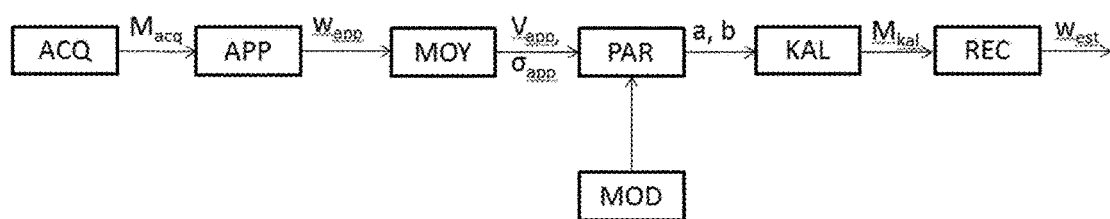
[Fig 3]
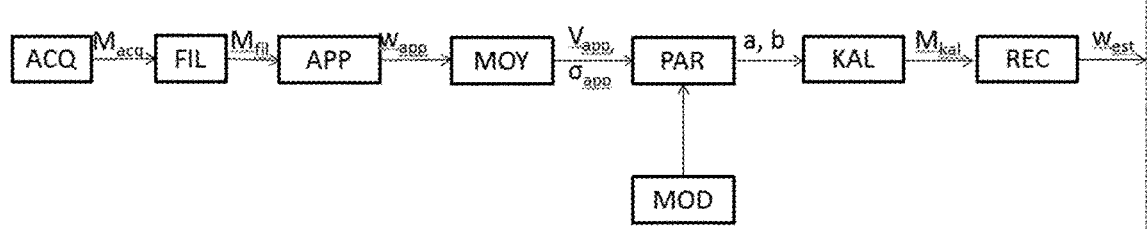

[Fig 4]
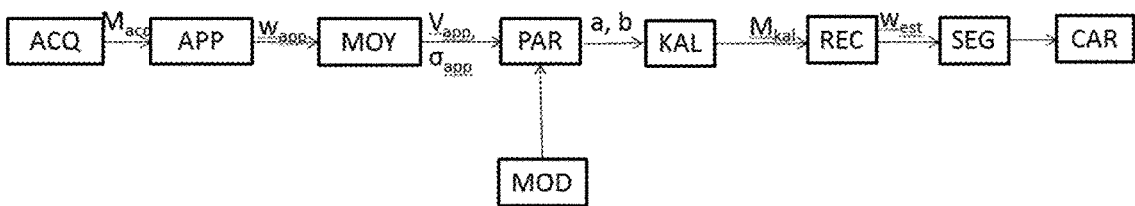
[Fig 5]

METHOD FOR DETERMINING WIND SPEED COMPONENTS BY MEANS OF A LASER REMOTE SENSOR

CROSS-REFERENCE TO RELATED APPLICATIONS

Reference is made to PCT/EP2021/063082 filed May 18, 2021, and French Patent Application No. 2005939 filed Jun. 8, 2020, which are incorporated herein by reference in their entirety.

BACKGROUND OF THE INVENTION

Field of the Invention

The present invention relates to the field of determining wind speed components, in particular for the purpose of evaluating the expediency of installing a wind turbine on a site.

Before installing a wind turbine, or a wind farm, it is necessary to evaluate the wind potential on this site. Indeed, the size of the wind turbine, its class and its structure depend on characteristics of the wind, such as average wind speed, maximum wind speed, wind turbulence intensity (which corresponds to the ratio of the standard deviation of the wind speed to the average wind speed), etc. For example, the size of the wind turbine may be chosen according to the distribution of the average value of the wind, and the class of the wind turbine may be chosen according to the turbulence intensity. Given that changing from one class of wind turbine to another has a significant cost, it is important to correctly ascertain the characteristics of the wind before installing a wind turbine.

In addition, this determination of wind speed components is particularly critical since it also makes it possible to ascertain the energy-producing resource. This is important for wind turbine projects, since this also defines the financial reliability of the wind turbine installation project.

Description of the Prior Art

In order to carry out these measurements, the conventional technique is to install a measurement mast on the measurement site. Such a measurement mast is equipped with a large number of sensors, and a specific installation that entails a significant cost, and is not easy to move from one site to another due to these dimensions.

In a second technique, it is possible to use a LiDAR (acronym for "light detection and ranging") sensor, which may also be understood to mean remote laser (from "light amplification by stimulated emission of radiation") sensing. LiDAR is a remote sensing or optical measurement technology based on analyzing the properties of a beam returned to its emitter. This method is used in particular to determine the distance to an object by way of a pulsed laser. Unlike radar based on a similar principle, the LiDAR sensor uses visible or infrared light rather than radio waves.

In the field of wind turbines, the LiDAR sensor is advertised as being a sensor essential to the correct operation of large wind turbines, especially as their size and power increase (nowadays 5 MW and soon 12 MW offshore). This sensor makes it possible to remotely measure wind, making it possible initially to calibrate the wind turbines so that they are able to provide a maximum amount of power (optimization of the power curve). For this calibration step, the LiDAR sensor may be positioned on the ground and oriented vertically (profiler), thereby making it possible to measure the wind speed and its direction, and the wind gradient according to altitude. This technique may be called placed LiDAR.

This technique is described in particular in patent applications EP3287810 and US published patent application 2019/293836.

However, it is important to provide processing of the measurement signals in order to obtain characteristics of the wind speed in an accurate, robust and reliable manner.

The radial measurement does not give access to a complete wind measurement. It is a projection of the wind onto the line of sight of the beam, filtered by the spatial transfer function inherent to LiDAR measurement technology, and has noise added by the measurement chain. To obtain information representative of the wind field passing above the placed LiDAR, it is thus necessary to combine multiple radial measurements with one another, and to combine them with processing capable of reproducing the contribution of wind in each measurement and of deriving a wind field or vector therefrom.

Standard reconstructions are based on the hypothesis that the radial measurement contains only content consistent with the measured wind, and that the wind field is uniform and homogeneous at a given altitude.

SUMMARY OF THE INVENTION

The present invention determines wind speed components in an accurate, robust, reliable and inexpensive manner. To this end, the invention relates to a method for determining wind speed components by way of a placed LiDAR sensor. For this method, the wind speed components are first approximated by the signals from the LiDAR sensor, and these approximations are used in a wind signal model, and then in a non-stationary Kalman filter, to construct filtered measurement signals. The filtered measurement signals are then used to reconstruct the wind speed components. Approximating the wind speed components makes it possible to construct a reliable and robust wind signal model, thereby allowing reliable and robust determination of the wind speed components. Indeed, by filtering the radial measurement which retains only the part thereof corresponding effectively to the contribution of wind to the measurement, the method makes it possible to obtain an estimate of the wind (amplitude and direction) whose average and standard deviation will be more representative and realistic. This makes possible using a placed LiDAR as a replacement for or in addition to a measurement mast, in order to carry out efficient, accurate and potentially less expensive site analyses.

The invention relates to a method for determining wind speed components by way of a LiDAR sensor, the LiDAR sensor being oriented substantially vertically in order to carry out the measurements in at least one substantially horizontal measurement plane. For this method, the following steps are implemented:

- a) Acquiring measurement signals from the LiDAR sensor in the at least one measurement plane;
- b) Determining an approximation of the wind speed components in the at least one measurement plane by way of a geometric reconstruction of the wind speed components based on the acquired measurement signals;
- c) Determining an average speed and a standard deviation of the wind in the at least one measurement plane by using the approximated wind speed components;

d) Constructing a wind signal model by using the sum of two first-order filters, the wind signal model being dependent on two parameters;

e) Determining the two parameters of the wind signal model by way of the determined standard deviation and the determined average wind speed;

f) Filtering the acquired measurement signals using a non-stationary Kalman filter, the wind signal model and the two determined parameters; and g) Determining the wind speed components in the at least one measurement plane, by using a geometric reconstruction of the wind speed components based on the filtered measurement signals.

According to one embodiment, the method comprises a step of filtering the measurement signals using a first-order low-pass filter for the step of approximating the wind speed components.

Advantageously, the wind signal model corresponds to a Kaimal model of the wind spectrum.

According to one aspect, a transfer function H of the wind signal model is written as:

$$H = \frac{a}{s} + \frac{b}{s+\tau}$$

where a, b are the two parameters, s is the Laplace variable, and t is the time constant.

Preferably, the parameters a and b are obtained using the equation:

$$\begin{bmatrix} a^2 \\ (a+b)^2 \end{bmatrix} = \begin{bmatrix} \frac{\tau^2}{\omega^4 + \tau^2\omega^2} & \frac{\omega^2}{\omega^4 + \tau^2\omega^2} \end{bmatrix}^{-1} \cdot \left( \vec{L} \cdot \overrightarrow{S(f, \sigma_k, V_{hub})} \right)$$

where f is the frequency vector, $\omega=2\pi f$, k is the index corresponding to the component in question, $\sigma_k$ is the standard deviation of the approximated wind speed, $V_{hub}$ is the approximated wind speed, L is the vector of the components of the direction of the measurement beam of the LiDAR sensor, and S is the vector of the spectral components of the Kaimal model of the wind spectrum.

According to one implementation, the covariance matrix of the non-stationary Kalman filter is determined by minimizing a cost function accounting for the dispersion and the average deviation of the measurement signals.

According to one embodiment, the reconstruction of the wind speed components using the measurement signals filtered by the non-stationary Kalman filter is implemented using a geometric reconstruction of the wind speed components based on the measurement signals filtered by the non-stationary Kalman filter.

According to one aspect, the method furthermore comprises the following steps:

a) Segmenting the determined wind speed components by a predetermined time interval; and b) Determining at least one characteristic of the wind speed for the predetermined time interval.

Advantageously, the predetermined time interval is between 1 min and 1 h, and preferably between 5 min and 30 min.

Advantageously, the at least one wind characteristic is chosen from among: an average wind speed, a standard deviation of the wind speed, maximum wind speed, average wind direction, wind turbulence intensity, an average of the vertical component of the wind speed, and a standard deviation of the vertical component of the wind speed.

Other features and advantages of the method according to the invention will become apparent on reading the following description of non-limiting exemplary embodiments, with reference to the appended figures described below.

BRIEF DESCRIPTION OF THE DRAWINGS

FIG. 1 illustrates a placed LiDAR sensor according to one embodiment of the invention.

FIG. 2 illustrates the steps of the method according to a first embodiment of the invention.

FIG. 3 illustrates the steps of the method according to a second embodiment of the invention.

FIG. 4 illustrates the steps of the method according to a third embodiment of the invention.

FIG. 5 illustrates the geometric parameterization at a measurement point.

DETAILED DESCRIPTION OF THE INVENTION

The present invention is a method for determining wind speed components by using a LiDAR sensor. Wind speed components is the name given to the projections of the wind speed in a reference frame, in particular in an orthonormal reference frame.

For the invention, the LiDAR sensor is directed substantially vertically. In other words, the measurement is directed along a substantially vertical axis. For example, the LiDAR sensor may be placed on the ground and oriented vertically. According to the invention, the LiDAR sensor makes it possible to measure the wind speed on at least one measurement plane. In view of the orientation of the LiDAR sensor, the measurement plane is substantially horizontal. There are multiple types of LiDAR sensor, for example scanned LiDAR sensors, continuous LiDAR sensors or pulsed LiDAR sensors. Within the scope of the invention, a pulsed LiDAR is preferably used. However, other LiDAR technologies may be used while remaining within the scope of the invention.

The LiDAR sensor allows a continuous measurement. The use of such a sensor therefore allows continuous determination of measurement signals. In addition, the LiDAR sensor is easily able to be moved from one site to another. For example, the sampling rate of the LiDAR sensor may be between 0.1 and 5 Hz (or even more in the future), and may be 1 Hz. In addition, the LiDAR sensor makes it possible to obtain relative information in multiple measurement planes at multiple heights. The LiDAR sensor may therefore be used to determine wind speed components at multiple heights, which may be used in particular to determine the variation in wind speed as a function of height.

FIG. 1 shows, schematically and without limitation, a placed LiDAR sensor 1 oriented vertically for the method according to one embodiment of the invention. The LiDAR sensor 1 is used to obtain at least one measurement signal on at least one measurement plane PM (only two measurement planes are shown). This figure also shows the x, y and z axes. The reference point for this reference frame is the center of the LiDAR sensor. The x direction is a horizontal direction. The y direction, perpendicular to the x direction, is a second horizontal direction (the x, y directions form a horizontal plane). The z direction is the vertical direction (corresponding to the measurement direction of the LiDAR sensor 1), directed upward and the z axis is perpendicular to the x and y axes. The measurement planes PM are planes formed by the x, y directions at a distance from the LiDAR sensor 1 (for a non-zero value of z). The measurement planes PM are parallel to one another.

As may be seen in FIG. 1, which is one exemplary embodiment of a pulsed LiDAR sensor, the LiDAR sensor 1 that is used comprises four measurement beams or axes 2. The measurement beams 2 are inclined with respect to the vertical z axis. Without limitation, the method according to the invention also works with a LiDAR sensor comprising any number of beams. The LiDAR sensor carries out a one-off measurement at each measurement point (b1, b2, b3, b4), which are points of intersection of a measurement plane PM and of a beam 2. These measurement points (b1, b2, b3, b4) are represented by black circles in FIG. 1.

This figure also shows, only at the point b1, the wind speed vector W, and these three components Wx, Wy, Wz, respectively on the x, y and z axes.

The method according to the invention comprises the following steps:

1—acquiring measurement signals;
2—approximating the wind speed components;
3—determining the average speed and the standard deviation;
4—constructing the wind signal frequency model;
5—determining the parameters of the model;
6—non-stationary Kalman filter; and
7—determining the wind speed components.

These steps will be described in detail in the remainder of the description. Steps 2 to 7 may be implemented by a computing system, in particular a computer. Steps 2 to 7 may be implemented offline after step 1.

FIG. 2 illustrates, schematically and without limitation, the steps of the method according to a first embodiment of the invention. First of all, the measurement signals Macq are acquired ACQ from the LiDAR sensor. Next, the wind speed components Wapp are approximated APP through a geometric reconstruction of the measurement signals Macq. The wind speed components Wapp are then used to determine MOY the average Vapp and the standard deviation σapp of the wind speed. These data are used, with the constructed wind signal model MOD, to determine PAR the parameters a and b of this wind signal model. Next, a non-stationary Kalman filter KAL is applied in order to obtain filtered measurement signals MKal. These measurement signals MKal make it possible to reconstruct REC the wind speed components West.

According to a second embodiment of the invention, the method may comprise an additional step of filtering the acquired measurement signals before approximating the wind speed components, in order to remove aberrant values. This makes possible increasing the robustness and the reliability of the method.

The method according to the second embodiment of the invention may thus comprise the following steps:

1—acquiring measurement signals;
1.2—filtering the measurement signals;
2—approximating the wind speed components;
3—determining the average speed and the standard deviation;
4—constructing the wind signal frequency model;
5—determining the parameters of the model;
6—non-stationary Kalman filter; and
7—determining the wind speed components.

These steps will be described in detail in the remainder of the description. Steps 1.2 to 7 may be implemented by a computation system, in particular a computer.

FIG. 3 illustrates, schematically and without limitation, the steps of the method according to the second embodiment of the invention. First of all, the measurement signals Macq are acquired ACQ from the LiDAR sensor. Second of all, the measurement signals Macq are filtered FIL in order to obtain the filtered measurement signals Mfil. Next, the wind speed components Wapp are approximated APP through a geometric reconstruction of the filtered measurement signals Mfil. The wind speed components Wapp are then used to determine MOY, the average Vapp and the standard deviation σapp of the wind speed. These data are used, with the constructed wind signal model MOD, to determine PAR the parameters a and b of this wind signal model. Next, a non-stationary Kalman filter KAL is applied in order to obtain filtered measurement signals MKal. These measurement signals MKal make it possible to reconstruct REC the wind speed components West.

According to a third embodiment of the invention, the method may comprise additional steps in order to determine a characteristic of the wind speed. For this third embodiment, the method may comprise the following steps:

1—acquiring measurement signals;
2—approximating the wind speed components;
3—determining the average speed and the standard deviation;
4—constructing the wind signal model;
5—determining the parameters of the model;
6—non-stationary Kalman filter;
7—determining the wind speed components;
8—segmenting the wind speed components; and
9—determining a characteristic of the wind speed.

These steps will be described in detail in the remainder of the description. Steps 2 to 9 may be implemented by a computing system, in particular a computer.

FIG. 4 illustrates, schematically and without limitation, the steps of the method according to a third embodiment of the invention. First of all, the measurement signals Macq are acquired ACQ from the LiDAR sensor. Next, the wind speed components Wapp are approximated APP through a geometric reconstruction of the measurement signals Macq. The wind speed components Wapp are then used to determine MOY the average Vapp and the standard deviation σapp of the wind speed. These data are used, with the constructed wind signal model MOD, to determine PAR the parameters a and b of this wind signal model. Next, a non-stationary Kalman filter KAL is applied in order to obtain filtered measurement signals MKal. These measurement signals MKal make it possible to reconstruct REC the wind speed components West. These wind speed components West are temporally segmented SEG. Next, a characteristic CAR of the wind speed is determined (for example average wind speed, or turbulence intensity).

The second and third embodiments may be combined.

1—Acquiring Measurement Signals

This step comprises acquiring the measurement signals from the LiDAR sensor for at least one measurement plane. In other words, the measurement signal from the sensor is acquired for each measurement point of at least one measurement plane. Advantageously, these measurement signals may be recorded, in particular in a computer memory, in order to be able to be processed by a computing system in the following steps.

In order to determine the wind speed components in multiple measurement planes, this step may be carried out for multiple measurement planes.

Advantageously, the measurement signals may be acquired over a long period of time, for example for a duration that may vary from several days and range up to a year, or even more.

1.2—Filtering the Measurement Signals

It will be recalled that this is an optional step. This step comprises filtering the measurement signals, in particular in order to limit aberrant values for the purpose of making the method more reliable and robust.

According to one embodiment, this filtering may be implemented by way of a first-order low-pass filter in order to reproduce a continuous and realistic representation of the measured wind state. This may be a filter with a variable time constant. The older the last valid value passed to the first-order filter, the more the time constant of the filter decreases (in other words, the weight of the state stored in the filter is increasingly low compared to the weight of the next valid value t). This embodiment makes it possible to derive an instantaneous, low-frequency, denoised and realistic value of the wind state contained in the radial measurements.

2—Approximating the Wind Speed Components

This step comprises approximating the wind speed components based on the measurement signals from the LiDAR sensor, or where applicable based on the filtered measurement signals from the LiDAR sensor. This approximation is used to adapt the measurement signal model. This is merely an approximation for an intermediate step, and the values of the wind speed components determined in step 7 of the method are more accurate, reliable and robust.

For this step, the wind speed components are reconstructed by way of a geometric reconstruction.

According to one embodiment of the invention, the geometric reconstruction of the wind speed components may implement a pseudo-inverse "Moore-Penrose" operation applied to the measurement signals (or where applicable to the filtered measurement signals).

FIG. 5 illustrates, schematically and without limitation, a geometric parameterization of the measurement signals from a LiDAR sensor. This figure shows a single beam 2 of a LiDAR sensor 1. This beam 2 is oriented along a measurement axis represented by the vector 1. This vector 1 is oriented with respect to the reference frame x, y, z (defined in the same way as for FIG. 1) by way of the angles θ and Φ. The angle θ is defined in the plane (x, y) with respect to the x axis. The angle Φ is defined with respect to the z axis. This figure also shows the wind speed vector W and these components Wx, Wy, Wz at the measurement point b1.

Using geometric projections, it is possible to write the following equations:

$$
\begin{bmatrix} m_1 \\ \vdots \\ m_i \\ \vdots \\ m_n \end{bmatrix} = \overbrace{\begin{bmatrix} \sin(\phi_1)\cos(\theta_1) & \sin(\phi_1)\sin(\theta_1) & \cos(\phi_1) \\ & \vdots & \\ \sin(\phi_i)\cos(\theta_1) & \sin(\phi_i)\sin(\theta_1) & \cos(\phi_i) \\ & \vdots & \\ \sin(\phi_n)\cos(\theta_n) & \sin(\phi_n)\sin(\theta_n) & \cos(\phi_n) \end{bmatrix}}^{M} \begin{bmatrix} w_x \\ w_y \\ w_z \end{bmatrix}
$$

Where 1, . . . , i, . . . , n are the measurement points of a measurement plane, and m1, . . . , mi, . . . , mn are the measurement signals of the measurement plane.

Using the pseudo-inverse "Moore-Penrose" operation, it is therefore possible to obtain the estimated wind speed components in the measurement plane by way of the measurement signals:

$$
\begin{bmatrix} w_x \\ w_y \\ w_z \end{bmatrix} = (M^T \cdot M)^{-1} \cdot M^T \cdot \begin{bmatrix} m_1 \\ \vdots \\ m_n \end{bmatrix}
$$

According to one implementation of the invention, this step may comprise a step of filtering the estimated speed, in particular in order to limit aberrant values for the purpose of making the method more reliable and robust.

According to one embodiment, this filtering may be implemented by way of a first-order low-pass filter in order to reproduce a continuous and realistic representation of the measured wind state. This may be a filter with a variable time constant. The older the last valid value passed to the first-order filter, the more the time constant of the filter decreases (in other words, the weight of the state stored in the filter is increasingly low compared to the weight of the next valid value). This embodiment makes it possible to derive an instantaneous, low-frequency, denoised and realistic value of the wind state contained in the radial measurements.

3—Determining the Average Speed and the Standard Deviation

This step comprises determining the average speed and its standard deviation based on the approximation of the wind speed components determined in step 2 (possibly filtered). For this step, it is possible to implement the conventional average and standard deviation calculations.

According to one embodiment of the invention, the average speed and its standard deviation may be determined over a rolling time horizon. For example, the rolling time horizon for this embodiment may be between 10 minutes and several days.

4—Constructing the Wind Signal Model

This step comprises constructing a wind signal model using the sum of two first-order filters, the wind signal model being dependent on two parameters. The two parameters make it possible to adjust the contributions of each filter to the measurement provided by the LiDAR sensor.

According to one embodiment of the invention, the wind signal model may comprise an integrator and a low-pass filter. The integrator makes it possible to illustrate the average speed of and the slow variation in the wind speed. The low-pass filter makes it possible to model instantaneous turbulence, with a time constant approximating the frequency response of the wind turbulence spectrum, as defined in the IEC61400-1 standard. The sum of the two filters makes it possible to model a power spectral density PSD signal consistent with the Kaimal model defined in the standard. The transfer function H corresponding to the PSD model may be given by (the function H is also called in the remainder of the wind signal model description):

$$
H = \frac{a}{s} + \frac{b}{s+\tau} = \frac{(a+b)s + a.\tau}{s^2 + \tau.s} = \begin{bmatrix} \frac{\tau}{s^2+\tau.s} & \frac{s}{s^2+\tau.s} \end{bmatrix} \cdot \begin{bmatrix} a \\ a+b \end{bmatrix}
$$

Where a and b are the parameters of the wind signal model, s is the Laplace variable, and τ is the time constant.

Thus, according to one embodiment of the invention, the wind signal model may correspond to the Kaimal model, which is written as:

$$\frac{fS_k(f)}{\sigma_k^2} = \frac{4fL_k/V_{hub}}{\left(1 + 6fL_k/V_{hub}\right)^{5/3}}$$

Where k is the index corresponding to the component under consideration (k varies between 1 and 3 and represents the z, y and x axes), f is the frequency, Vhub is the average wind speed obtained in step 3, $\sigma$ is the standard deviation component, Sk is the spectrum of the speed component in the direction k, and Lk is an integral scale parameter of the speed component.

The following relationship is also present:

$$\sigma_k^2 = \int_0^\infty S_k(f) df$$

And the parameter ok is linked to the standard deviation determined in the previous step, depending on the component under consideration. For example, for the z axis, $\sigma 1$ may have the value of the standard deviation, for the y axis, $\sigma 2$ may be 0.8 times the standard deviation, and for the x axis, $\sigma 3$ may be 0.5 times the standard deviation.

The parameter L may be linked to a scale parameter.

As a variant, the method according to the invention is adapted to other wind models, such as the "Von Karman" model.

5—Determining the Parameters of the Model

This step comprises determining the parameters of the wind signal model by way of the standard deviation and the average wind speed both determined in step 3. Thus, at the end of this step, the wind signal model is adapted to the measurements carried out by the LiDAR sensor, thereby making it possible to make the determination of the wind speed components accurate.

According to the embodiment of the transfer function H described above, the parameters a and b of the transfer function are determined. It is possible to determine the parameters a, and b, by way of the following equation:

$$|H|^2 = \left[\frac{\tau^2}{\omega^4 + \tau^2\omega^2} \quad \frac{\omega^2}{\omega^4 + \tau^2\omega^2}\right] \cdot \left[\begin{array}{c} a^2 \\ (a+b)^2 \end{array}\right] \approx \overrightarrow{L.S(f, \sigma_k, V_{hub})}$$

In which the vector L is the vector of the components of the direction of the measurement beam in question, and S is the vector of the spectral components of the Kaimal model, which depend on known parameters, in particular the average wind speed and the standard deviation both determined in step 3.

It is thus possible to estimate the parameters a and b using the equation:

$$\left[\begin{array}{c} a^2 \\ (a+b)^2 \end{array}\right] = \left[\frac{\tau^2}{\omega^4 + \tau^2\omega^2} \quad \frac{\omega^2}{\omega^4 + \tau^2\omega^2}\right]^{-1} \cdot \left(\overrightarrow{L.S(f, \sigma_k, V_{hub})}\right)$$

6—Non-Stationary Kalman Filter

This step comprises filtering the measurement signals obtained in step 1 by way of a non-stationary Kalman filter, the wind signal model constructed in step 4 and the parameters of the wind signal model determined in step 5. This thus gives filtered measurement signals suitable for accurately determining the wind speed components, in a robust manner. It will be recalled that a Kalman filter is an infinite impulse response filter that estimates the states of a dynamic system based on a series of incomplete or noisy measurements. The filter is described as being a non-stationary because the model embedded in the Kalman filter, explained in particular in steps 4 and 5, describes a signal with a priori variable variance and average, depending on the measurement conditions and the characteristics of the measured wind.

For this purpose, it is possible to formulate the transfer function H in the continuous state space as follows:

$$\begin{cases} \dot{X} = A.X + B.U \\ Y = C.X + D.U \end{cases}$$

$$\text{Where } A = \begin{pmatrix} -\tau & 0 \\ 1 & 0 \end{pmatrix}, B = \begin{pmatrix} 1 \\ 0 \end{pmatrix}, C = \begin{pmatrix} a+b \\ a.\tau \end{pmatrix} \text{and } D = \begin{pmatrix} 0 \\ 0 \end{pmatrix}$$

X contains the states of the transfer function H and

Y contains the estimate of the contribution of the wind to the raw and noisy radial measurement.

Y is therefore the filtered radial measurement, in other words the measurement signal filtered by the non-stationary Kalman filter.

By discretizing this transfer function, it is possible to write:

$$X_{k+1} = A.X_k + B.U_k$$

$$Y_k = C.X_k + D.U_k$$

$$\text{Where } A = \begin{pmatrix} e^{-\tau.T_s} & 0 \\ \dfrac{1 - e^{-\tau.T_s}}{\tau} & 0 \end{pmatrix},$$

$$B = \begin{pmatrix} \dfrac{1 - e^{-\tau.T_s}}{\tau} \\ T_s - \dfrac{1 - e^{-\tau.T_s}}{\tau} \\ \dfrac{}{\tau} \end{pmatrix}, C = \begin{pmatrix} a+b \\ a.\tau \end{pmatrix} et D = \begin{pmatrix} 0 \\ 0 \end{pmatrix}$$

Where Ts is the sampling time of the discretization.

For this step, it is also possible to implement the following recurrence equations:

At the time k, the prediction of the state at the time k+1 is denoted $x_{k+1|k}$, and the predicted output is denoted $y_{k+1|k}$ where $x_{k+1|k} = Ax_{k|k}$ $y_{k+1|k} = CAx_{k|k}$.

The confidence in this prediction, corresponding to the covariance of the error on the state, is as follows: $P_{k+1|k} = AP_{k|k}A^T + BQ_kB^T$ where Q is the covariance matrix.

This prediction thus gives the most probable value of the state and the output.

At the time k+1, the prediction is updated with the measurement:

$$x_{k+1|k+1} = x_{k+1|k} + K_{k+1}(y_{k+1} - y_{k+1|k})$$

The gain K may be given by:

$$K = P_{k+1|k} * C^{T*}(Ck+1|kC^T + DQ_{k+1}D^T + V_{k+1}),$$

It is then possible to update the prediction matrix:

$$P_{k+1|k+1} = (I - K_{k+1}P_{k+1|k}C)P_{k+1|k}$$

According to one embodiment of the invention, the covariance matrix of the non-stationary Kalman filter may be determined by minimizing a cost function that takes into account the dispersion and the average deviation of the measurement signals. The philosophy of adjusting the covariance matrix may be summarized as follows: The more complex the site, the more uncertain the model, and the higher the "method noise" (corresponding to the covariance matrix).

For example, the following operations may be implemented:

The prerequisite: having measurement data from the LiDAR sensor and what are known as reference data, for example originating from an anemometric measurement mast. The placed LiDAR sensor may be positioned close enough to the measurement mast for the respective measurements to be correlated.

The principle:

Developing a relevant cost function, taking into account the dispersion and the deviation of the reconstructed turbulence intensity TI compared to the TI resulting from the "mast" measurements.

The cost function is minimized using suitable optimization algorithms, by adjusting the "multiplicative gain of the covariance matrix Q" parameter.

Preferably, it is possible to add optimization constraints as a function of an acceptable error constraint. For example, this acceptable error constraint may be defined according to a range of average wind speeds.

7—Determining the Wind Speed Components

This step comprises determining the wind speed components in at least one measurement plane, by way of the measurement signals filtered by way of the non-stationary Kalman filter obtained in step 6. For this step, a reconstruction of the wind speed components is implemented based on the measurement signals filtered by the non-stationary Kalman filter. This step thus makes it possible to determine wind speed components in a robust and accurate manner.

Multiple reconstruction techniques, based on stronger or weaker wind homogeneity, spatial coherence and/or fixed turbulence propagation hypotheses may be used for this step.

According to one embodiment, the reconstruction of the wind speed components by way of the filtered measurement signals may be implemented by way of a geometric reconstruction of the wind speed components based on the filtered measurement signals. In other words, for this embodiment, it is possible to implement the method for reconstructing wind speed components that is implemented in step 2, that is to say the geometric reconstruction of the wind speed components implementing a pseudo-inverse "Moore-Penrose" operation applied to the measurement signals filtered by the non-stationary Kalman filter.

8—Segmenting the Wind Speed Components

It should be noted that this step is optional. This step may be implemented in order to determine at least one characteristic of the wind speed based on the wind speed components. This step comprises temporally segmenting the wind speed components obtained in the previous step by a predetermined time interval. In other words, datasets of wind speed components are generated for the predetermined time interval. The predetermined time interval is the one over which it is desired to determine the characteristic of the wind speed.

According to one embodiment of the invention, the predetermined time interval may be between 1 min and 1 h, preferably between 5 min and 30 min, and may for example be 10 min. These time intervals make it possible to have a significant characteristic of the wind speed, in order to determine the possibility of installing a wind turbine at the measurement location.

9—Determining a Characteristic of the Wind Speed

It should be noted that this step is optional, and follows step 8. This step comprises determining at least one characteristic of the wind speed over the predetermined time interval, for at least one measurement plane.

According to one embodiment of the invention, a wind characteristic is chosen from among: an average wind speed, a standard deviation of the wind speed, a maximum wind speed, an average wind direction, wind turbulence intensity, an average of the vertical component of the wind speed, and a standard deviation of the vertical component of the wind speed.

Preferably, in this step, it is possible to determine at least the wind turbulence intensity over the predetermined time interval, which corresponds to the ratio of the standard deviation of the wind speed to the wind speed. Indeed, this characteristic makes it possible to determine the class of the wind turbine.

Preferably, it is possible to determine at least wind turbulence intensity over the predetermined time interval, an average wind speed and an average wind direction. Indeed, these characteristics make it possible to determine the class of the wind turbine, its position and its dimensions.

The present invention furthermore relates to a method for installing a wind turbine, in which method the following steps are implemented:

At least one of determining the wind speed components, and at least one characteristic of the wind speed, by way of the method according to any one of the variants or combinations of variants described above, pertaining to at least one site, At least one of installing a wind turbine on the site as a function of the wind speed components and as a function of the at least one characteristic of the wind speed.

In the installation step, it is possible to determine the wind turbine that is installed in terms of dimensions, class and its structure, and it is also possible to determine its orientation and its control by at least one of a function of the wind speed components and as a function of the at least one characteristic of the wind speed.

According to one implementation of the invention, the first step may be repeated on multiple sites. Next, the site most suitable for the installation of a wind turbine is determined by the at least one of a function of the wind speed components and as a function of the at least one characteristic of the wind speed. This may be in particular the site at which the wind speed is within an operating range suitable for the recovery of energy by a wind turbine.

The invention claimed is:

1. A method of installing a wind turbine at a measurement site comprising:

a) sensing wind speed components at the measurement site with a LiDAR sensor oriented vertically by making measurements in at least one horizontal measurement plane;

b) acquiring measurement signals from the LiDAR sensor in the at least one horizontal measurement plane;

c) determining an approximation of the wind speed components in the at least one horizontal measurement plane by using a geometric reconstruction of the wind speed components based on the acquired measurement signals;

d) determining an average speed and a standard deviation of the wind speed in the at least one measurement horizontal plane by using the approximation of the wind speed components;

e) constructing a wind signal model using a sum of two first-order filters with the wind signal model being dependent on parameters of the wind signal model;

f) determining the parameters of the wind signal model by using the determined standard deviation and the determined average of the sensed wind speed components;

g) filtering the acquired measurement signals by using a non-stationary Kalman filter, the wind signal model and the determined parameters of the wind signal model;

h) determining the wind speed components in the at least one measurement plane by using a geometric reconstruction of the wind speed components based on the acquired filtered measurement signals; and i) installing the wind turbine at the measurement site wherein the wind turbine installed at the measurement site has dimensions, structure, orientation and is controlled as a function of at least one of the determined wind speed components and as a function of at least one characteristic of the wind speed at the measurement site.

2. The method as claimed in claim 1, comprising filtering the measurement signals using a first-order low-pass filter for approximating the wind speed components.

3. The method as claimed in claim 2, wherein the wind signal model is a Kaimal model of the wind spectrum of the wind.

4. The method as claimed in claim 3, wherein a transfer function H of the wind signal model (MOD) is written:

$$H = \frac{a}{s} + \frac{b}{s + \tau}$$

where a, b are the two parameters, s is the Laplace variable, and $\tau$ is a time constant.

5. The method as claimed claim 3, wherein a reconstruction of the wind speed components using measurement signals filtered by the non-stationary Kalman filter is implemented by the geometric reconstruction of the wind speed components based on the measurement signals filtered by the non-stationary Kalman filter.

6. The method as claimed in claim 2, wherein a transfer function H of a wind signal model (MOD) is written:

$$H = \frac{a}{s} + \frac{b}{s + \tau}$$

where a, b are the two parameters, s is the Laplace variable, and $\tau$ is a time constant.

7. The method as claimed in claim 6, wherein the parameters a and b are obtained using the equation:

$$\begin{bmatrix} a^2 \\ (a+b)^2 \end{bmatrix} = \begin{bmatrix} \frac{\tau^2}{\omega^4 + \tau^2\omega^2} & \frac{\omega^2}{\omega^4 + \tau^2\omega^2} \end{bmatrix}^{-1} \cdot \left( \overrightarrow{L.S(f, \sigma_k, V_{hub})} \right)$$

where f is a frequency vector, $\omega = 2\pi f$, k is an index corresponding to the wind speed components, $\sigma_k$ is a standard deviation of approximated wind speed, $V_{hub}$ is the approximation, L is a vector of the components of a direction of a measurement beam of the LiDAR sensor, and S is a vector of spectral components of a Kaimal model of the wind spectrum.

8. The method as claimed in claim 2, wherein the parameters a and b are obtained using the equation:

$$\begin{bmatrix} a^2 \\ (a+b)^2 \end{bmatrix} = \begin{bmatrix} \frac{\tau^2}{\omega^4 + \tau^2\omega^2} & \frac{\omega^2}{\omega^4 + \tau^2\omega^2} \end{bmatrix}^{-1} \cdot \left( \overrightarrow{L.S(f, \sigma_k, V_{hub})} \right)$$

where f is a frequency vector, $\omega = 2\pi f$, k is an index corresponding to the wind speed components, $\sigma_k$ is a standard deviation of approximated wind speed, $V_{hub}$ is the approximation, L is a vector of the components of a direction of a measurement beam of the LiDAR sensor, and S is a vector of spectral components of a Kaimal model of the wind spectrum.

9. The method as claimed claim 2, wherein a reconstruction of the wind speed components using measurement signals filtered by the non-stationary Kalman filter is implemented by the geometric reconstruction of the wind speed components based on the measurement signals filtered by the non-stationary Kalman filter.

10. The method as claimed in claim 9, wherein the at least one wind characteristic is chosen from average wind speed, standard deviation of wind speed, maximum wind speed, average wind direction, wind turbulence intensity, average of a vertical component of wind speed, and a standard deviation of the vertical component of the wind speed.

11. The method as claimed in claim 1, wherein the wind signal model is a Kaimal model of a wind spectrum of the wind.

12. The method as claimed in claim 11, wherein a transfer function H of the wind signal model (MOD) is written:

$$H = \frac{a}{s} + \frac{b}{s + \tau}$$

where a, b are the two parameters, s is the Laplace variable, and $\tau$ is a time constant.

13. The method as claimed claim 11, wherein a reconstruction of the wind speed components using measurement signals filtered by the non-stationary Kalman filter is implemented by the geometric reconstruction of the wind speed components based on the measurement signals filtered by the non-stationary Kalman filter.

14. The method as claimed in claim 1, wherein a transfer function H of the wind signal model (MOD) is written:

$$H = \frac{a}{s} + \frac{b}{s + \tau}$$

where a, b are the two parameters, s is the Laplace variable, and $\tau$ is a time constant.

15. The method as claimed in claim 14, comprising steps of:

a) segmenting the determined wind speed components by a predetermined time interval; and b) determining at least one characteristic of the wind speed for the predetermined time interval.

16. The method as claimed in claim 15, wherein the predetermined time interval is between 1 min and 1 h.

17. The method as claimed in claim 14, wherein a transfer function H of the wind signal model (MOD) is written:

$$H = \frac{a}{s} + \frac{b}{s + \tau}$$

where a, b are the two parameters, s is the Laplace variable, and $\tau$ is a time constant.

18. The method as claimed in claim 14, wherein the parameters a and b are obtained using the equation:

$$\begin{bmatrix} a^2 \\ (a+b)^2 \end{bmatrix} = \begin{bmatrix} \dfrac{\tau^2}{\omega^4 + \tau^2\omega^2} & \dfrac{\omega^2}{\omega^4 + \tau^2\omega^2} \end{bmatrix}^{-1} \cdot \left(\overrightarrow{\vec{L}.S(f, \sigma_k, V_{hub})}\right)$$

where f is a frequency vector, $\omega = 2\pi f$, k is an index corresponding to the component in question, $\sigma_k$ is a standard deviation of the approximated wind speed, $V_{hub}$ is an approximated wind speed, L is a vector representing a direction of the components of a measurement beam of the LiDAR sensor, and S is a vector of spectral components of a Kaimal model of the wind spectrum.

19. The method as claimed in claim 14, wherein the parameters a and b are obtained using the equation:

$$\begin{bmatrix} a^2 \\ (a+b)^2 \end{bmatrix} = \begin{bmatrix} \dfrac{\tau^2}{\omega^4 + \tau^2\omega^2} & \dfrac{\omega^2}{\omega^4 + \tau^2\omega^2} \end{bmatrix}^{-1} \cdot \left(\overrightarrow{\vec{L}.S(f, \sigma_k, V_{hub})}\right)$$

where f is a frequency vector, $\omega = 2f$, k is an index corresponding to the wind speed components, $\sigma_k$ is a standard deviation of approximated wind speed, $V_{hub}$ is the approximation, L is a vector of the components of a direction of a measurement beam of the LiDAR sensor, and S is a vector of spectral components of a Kaimal model of the wind spectrum.

20. The method as claimed in claim 1, wherein a covariance matrix of the non-stationary Kalman filter is determined by minimizing a cost function accounting for dispersion and an average deviation of the acquired measurement signals.

21. The method as claimed claim 1, wherein a reconstruction of the wind speed components using measurement signals filtered by the non-stationary Kalman filter is implemented by the geometric reconstruction of the wind speed components based on the measurement signals filtered by the non-stationary Kalman filter.

22. The method in accordance with claim 1, comprising repeating step b) at other measurement sites and installing the wind turbine at the installation site.

* * * * *